(12) United States Patent
Stuart et al.

(10) Patent No.: US 6,268,586 B1
(45) Date of Patent: Jul. 31, 2001

(54) METHOD AND APPARATUS FOR IMPROVING THE QUALITY AND EFFICIENCY OF ULTRASHORT-PULSE LASER MACHINING

(75) Inventors: Brent C. Stuart, Fremont; Hoang T. Nguyen; Michael D. Perry, both of Livermore, all of CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/302,021

(22) Filed: Apr. 29, 1999

Related U.S. Application Data
(60) Provisional application No. 60/083,602, filed on Apr. 30, 1998.

(51) Int. Cl.$^7$ .................................................. B23K 26/38
(52) U.S. Cl. ................................ 219/121.72; 219/121.67
(58) Field of Search ........................ 219/121.67, 121.7, 219/121.71, 121.72, 121.78, 121.79, 121.8, 121.81, 121.73

(56) References Cited

U.S. PATENT DOCUMENTS

| | | | |
|---|---|---|---|
| 3,549,733 | * | 12/1970 | Caddell . |
| 4,547,651 | * | 10/1985 | Maruyama . |
| 4,908,493 | * | 3/1990 | Susemihl .................... 219/121.67 |
| 5,223,692 | * | 6/1993 | Lozier et al. ............... 219/121.67 |
| 5,235,606 | * | 8/1993 | Mourou et al. . |
| 5,656,186 | * | 8/1997 | Mourou et al. ............. 219/121.69 |
| 6,130,403 | * | 10/2000 | Wakabayashi . |

FOREIGN PATENT DOCUMENTS

| | | | |
|---|---|---|---|
| 2090047 | * | 6/1982 | (GB) ........................... 219/121.67 |
| 60-33892 | * | 2/1985 | (JP) ............................. 219/121.81 |
| 61-269992 | * | 11/1986 | (JP) ............................. 219/121.78 |

* cited by examiner

*Primary Examiner*—Geoffrey S. Evans
(74) *Attorney, Agent, or Firm*—John P. Woolridge; Alan H. Thompson

(57) ABSTRACT

A method and apparatus for improving the quality and efficiency of machining of materials with laser pulse durations shorter than 100 picoseconds by orienting and maintaining the polarization of the laser light such that the electric field vector is perpendicular relative to the edges of the material being processed. Its use is any machining operation requiring remote delivery and/or high precision with minimal collateral dames.

20 Claims, 2 Drawing Sheets

METHOD AND APPARATUS FOR IMPROVING THE QUALITY AND EFFICIENCY OF ULTRASHORT-PULSE LASER MACHINING

RELATED APPLICATIONS

This application claims priority in a provisional application filed on Apr. 30, 1998, entitled "Method and Apparatus for Improving the Quality and Efficiency of Ultrashort-Pulse Laser Machining," Ser. No. 60/083,602, by inventors Brent C. Stuart, Hoang T. Nguyen, Michael D. Perry.

This application is a continuation-in-part of U.S. patent application Ser. No. 08/859,020, titled "Ultrashort Pulse Laser Machining of Metals and Alloys" which is a continuation-in-part of U.S. Pat. No. 5,720,894, titled "Ultrashort Pulse High Repetition Rate Laser System for Biological Tissue Processing."

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to laser machining and more specifically, it relates to improving cut quality and rate by appropriately orienting the polarization vector of a series of ultrashort laser pulses when laser machining materials.

2. Description of Related Art

Lasers have been used to machine or cut a target comprised of a rigid material, such as metals, wood, rubber, plastics or ceramics. In the machining process, a laser beam thermally reacts with the target and vaporizes the material to remove material from the target. Conventionally, the beam output from such a laser is focused onto the target material. Minimal significance has been given to the polarization of the beam used in laser machining processes. The state of polarization of the beam was thought to make very little difference in the size or shape of the aperture which resulted from the beam thermally reacting with the material. Where polarization has been observed to affect the quality of the cut, the prior art has taught that the use of conventional laser parameters produces an asymmetric cut. In addition, the depth of penetration is taught to be deeper, for conventional laser parameters, where the direction of polarization is parallel to the machining direction.

U.S. Pat. No. 4,336,439, issued Jun. 22, 1982, titled "Method and Apparatus for Laser Scribing and Cutting" by Sasnett et al., describes polarization control to remove material such that the removed portion is symmetrically shaped. The patent describes a laser system adapted for generating a high power laser beam which is aligned to impinge a target of a rigid material to thermally react with the material to remove a portion therefrom, and where a laser means for generating the high power beam of electromagnetic coherent radiation has a state of polarization. The beam is aligned to impinge the material. Controlling means are provided to control the polarization of the beam with respect to the material such that the portion removed is symmetrically shaped. In one embodiment, the incident beam is linearly polarized and the direction of polarization is perpendicular to the direction of machining. The resultant aperture produces an asymmetric hole which is curved back to the bottom in the direction opposite that of the direction of machining. In addition, the depth of penetration is not as deep, for the parameters disclosed, as another shown embodiment where the direction of polarization is parallel to the direction of travel. The disclosed laser parameters include use of a series of laser pulses of about 100–300 microsecond duration, with the beam (or the material) moving at a speed of about 10 inches per second and a pulse repetition rate of between 1500 and 2000 pulses per second.

U.S. Pat. No. 4,547,651, issued Oct. 15, 1985, titled "Laser Machining Apparatus" provides a laser machining apparatus comprising an optical resonator including a pair of partially and totally reflecting mirrors disposed in opposite relationship to each other and a laser medium disposed between the pair of the partially and totally reflecting mirrors to generate a laser beam through the amplification by the laser medium, at least one polarizer disposed between the partially and totally reflecting mirrors to cross the laser beam and to be rotatable about the optical axis of the laser beam, the polarizer linearly polarizing the laser beam, and a driving means for rotating the at least one polarizer about the optical axis of the laser beam so that the linearly polarized laser beam has a plane of polarization coinciding with a direction in which the linearly polarized laser beam machines a workpiece.

U.S. Pat. No. 5,720,894, issued Feb. 24, 1998, titled "Ultrashort Pulse High Repetition Rate Laser System for Biological Tissue Processing" describes systems for removal of biological and other types of material with minimal collateral damage and greatly increased cut quality by using laser pulses of duration less than 100 picoseconds. More specifically, the duration of each laser pulse is on the order of about 1 fs to less than 50 ps such that energy deposition is localized in a small depth and occurs before significant hydrodynamic motion and thermal conduction, leading to collateral damage, can take place. The depth of material removed per pulse is on the order of about 1 micrometer, and the minimal thermal and mechanical effects associated with this ablation method allows for high repetition rate operation, in the region 10 to over 1000 Hertz, which, in turn, achieves high material removal rates. The input laser energy per ablated volume of tissue is small, and the energy density required to ablate material decreases with decreasing pulse width. The ablation threshold and ablation rate are only weakly dependent on material type and condition, allowing for maximum flexibility of use in various material removal applications. The use of a chirped-pulse amplified Titanium-doped sapphire laser is disclosed as the source in one embodiment.

SUMMARY OF THE INVENTION

It is an object of the present invention to control the polarization of ultrashort laser pulses striking a material to be machined to provide a means for improving the machining quality and rate.

In the present invention, the laser beam consists of pulses of duration <100 ps at a high repetition rate of >10 Hz. This method of polarization control can be applied to the cutting of straight or shaped slots or to the drilling of circular or shaped holes. The laser polarization direction is maintained so that the electric field vector points as much as possible into the material being processed. In this configuration, the electric field vector is oriented perpendicular to the machining direction. The electric field vector (E) extends into the side walls of the cut as opposed to running along the direction of cutting or around the outside of the hole. The cross sectional geometry of the cut (kerf profile) and the angle of cutting relative to the surface can be arbitrary.

When cutting slots, the present invention provides for maintaining the polarization in a direction perpendicular to the direction of cutting. This can be accomplished by rotating the laser polarization or by rotating the material being cut. The cut quality when maintaining the polarization perpendicular to the cutting direction is vastly improved as the laser more easily clears out the material all the way through the cut depth. Related to the improved cut quality, the rate of cutting increases as it takes approximately one-half the time to completely clear out the slot with polarization perpendicular to the cutting direction as compared to cutting with the polarization parallel to the cutting direction.

When drilling holes, this invention provides for rotating the polarization in a controlled manner about an axis defined by the laser propagation direction. This can be accomplished by changing the polarization to circular or elliptical, or by using linear polarization and physically rotating the polarization vector. Physical rotation of the polarization vector can be accomplished by rotation of optics (e.g. phase retardation plates) in the laser beam path or by rotation of the part itself.

Laser systems and optical layouts usable in the present invention include an ultrashort pulse laser system and may consist of any gain medium and combination of optics and thus any wavelength, as long as the pulse duration is shorter than 100 picoseconds and preferably shorter than 10 picoseconds. The polarization control consists of any combination of optics (mirrors, polarizers, waveplates, etc.) and means to translate or rotate these optics in order to produce and maintain the desired polarization. The transport/focusing optics consist of mirrors, lenses, phase plates, etc., to produce the desired spatial distribution on the material to be processed. The material to be processed may consist of metals, dielectrics, semiconductors, or any combination thereof. The material may be placed on a translation or rotation stage for motion of the material relative to the laser or alternatively the laser may be moved by the transport optics relative to the material. The processing can take place in any environment (air, vacuum, gas, liquid, solid).

DETAILED DESCRIPTION OF THE INVENTION

The present invention provides a means for improving the machining quality and rates of machining by controlling the polarization of the laser beam striking the material to be machined. This improvement applies to laser machining in the "ultrashort-pulse" regime, where the laser beam consists of pulses of duration <100 ps at a high repetition rate of >10 Hz. This method of polarization control can be applied to the cutting of straight or shaped slots or to the drilling of circular or shaped holes.

Figure 1A:
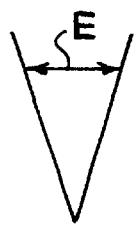
FIG. 1A shows a side view of a straight slot cut with the present invention.
Figure 1B:
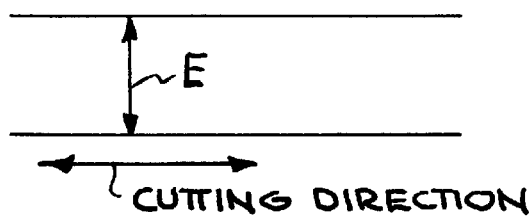
FIG. 1B shows the electric field vector oriented perpendicular to the cutting direction.
Figure 2A:
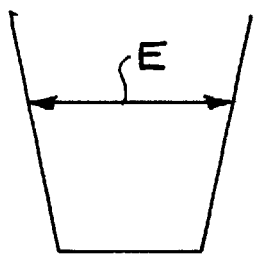
FIG. 2A shows a side view of a hole cut with the present invention.
Figure 2B:
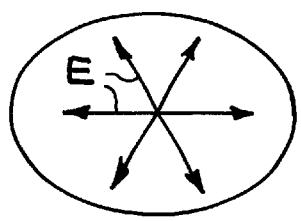
FIG. 2B shows a top view of the hole of FIG. 2A, where the polarization is rotated about a central axis of the hole.
Figure 3A:
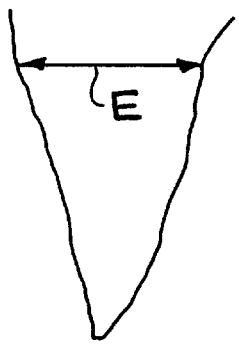
FIG. 3A shows a shaped slot cut with the present invention.
Figure 3B:
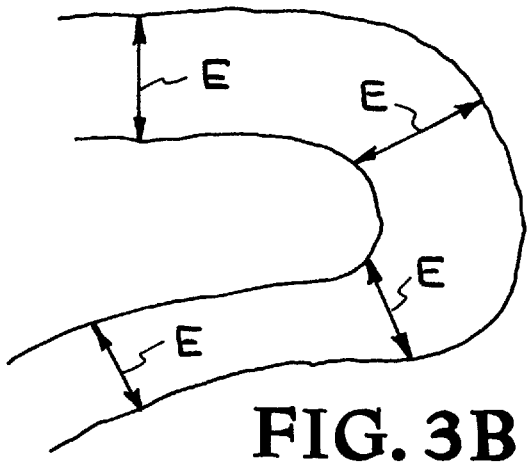
FIG. 3B shows a top view of the slot of FIG. 3A, where the electric field vector is oriented to be perpendicular to the direction of the cut.

The method of improved cutting in the short-pulse regime consists of maintaining the laser polarization direction so that the electric field vector points as much as possible into the material being processed. In this configuration, the electric field vector is oriented perpendicular to the machining direction. FIGS. 1A, 2A and 3A show three examples of possible geometries in which this technique can be applied. FIG. 1A shows a side view of a straight slot cut with the present method. FIG. 1B shows the electric field vector oriented perpendicular to the cutting direction. FIG. 2A shows a side view of a hole cut with the present invention. FIG. 2B shows a top view of the hole of FIG. 2A, where the polarization is rotated about a central axis of the hole. FIG. 3A shows a shaped slot cut with the present invention. FIG. 3B shows a top view of the slot of FIG. 3A where the electric field vector is oriented to be perpendicular to the direction of the cut. In each case, the electric field vector (E) extends into the side walls of the cut as opposed to running along the direction of cutting or around the outside of the hole. The cross sectional geometry of the cut (kerf profile) and the angle of cutting relative to the surface can be arbitrary.

Figure 4:
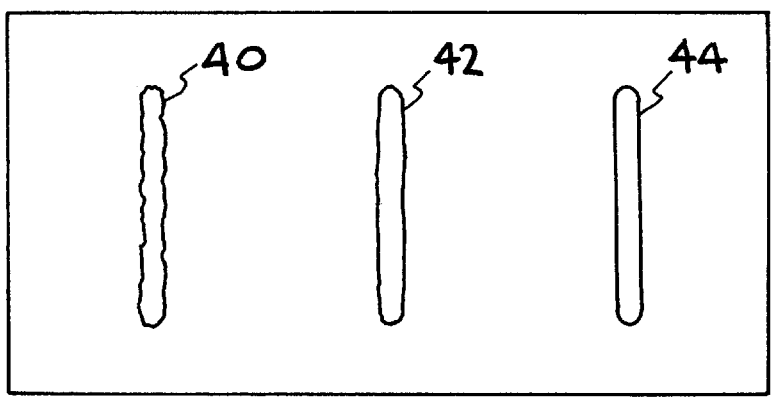
FIG. 4 compares the quality of cuts through stainless steel in three different polarizations: parallel to the cutting direction, circular, and perpendicular to the cutting direction.

When cutting slots, the present invention provides for maintaining the polarization in a direction perpendicular to the direction of cutting. This can be accomplished by rotating the laser polarization or by rotating the material being cut. The improvement in cut quality is demonstrated in FIG. 4, which compares the quality of cuts through stainless steel in three different polarizations: parallel to the cutting direction, circular, and perpendicular to the cutting direction. The cut 40 on the left of the figure was made with the electric field vector parallel to the direction of the cut. The center cut 42 in the figure was made with circular polarization. The cut 44 on the right side of the figure was made with the electric field vector perpendicular to the direction of the cut The cut quality when maintaining the polarization perpendicular to the cutting direction, as shown by cut 44, is vastly improved as the laser more easily clears out the material all the way through the cut depth.

Corresponding to the improved cut quality, the rate of cutting increases as it takes approximately one-half the time to completely clear out the slot with polarization perpendicular to the cutting direction as compared to cutting with the polarization parallel to the cutting direction.

When drilling holes, this invention provides for rotating the polarization in a controlled manner about an axis defined by the laser propagation direction. This can be accomplished by changing the polarization to circular or elliptical, or by using linear polarization and physically rotating the polarization vector. Physical rotation of the polarization vector can be accomplished by rotation of optics (e.g. phase retardation plates) in the laser beam path or by rotation of the part itself.

Figure 5:
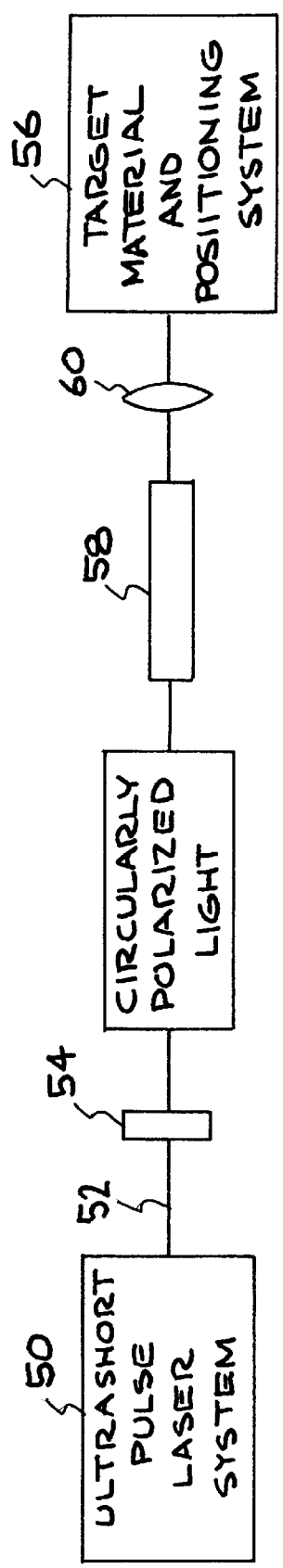
FIGS. 5 and 6 show embodiments of laser systems and optical layouts usable in the present invention.
Figure 6:
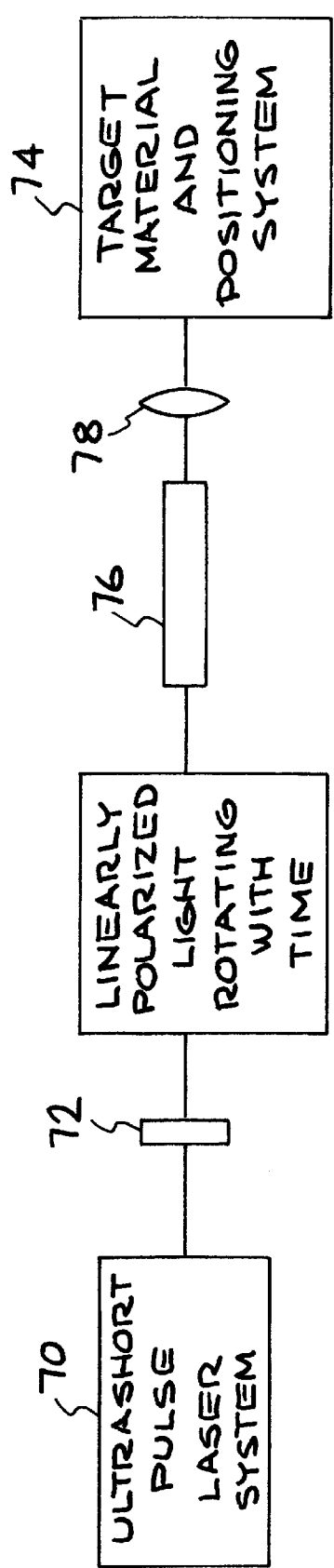

The apparatus for realization of this invention consists of a laser, polarization control, cutting optics, and material to be processed. Examples of laser systems usable in the present invention are described in U.S. Pat. No. 5,720,894, which is incorporated herein by reference. Other examples of laser systems usable in the present invention are described in U.S. Pat. No. 5,960,016, titled "Aberration-Free, All- Reflective Stretcher For Chirped-Pulse Amplification", and U.S. patent application Ser. No. 08/859,020, pending titled "Ultrashort Pulse Laser Machining of Metals and Alloys" which are incorporated herein by reference. Embodiment laser systems and optical layouts are generally described in FIGS. 5 and 6. In FIG. 5, an ultrashort pulse laser system 50 produces linearly polarized light 52. Quarter-waveplate 54 produces circularly polarized light which is transported to the target material 56 through beam transport 58 and focusing assembly 60. In this embodiment, the target material 56 is continuously repositioned by a positioning system to maintain the electric field vector of the laser beam to be perpendicularly oriented to the target material cutting direction. In FIG. 6, ultrashort pulse laser system 70 produces linearly polarized light. The linearly polarized light from laser system 70 is then rotated by a half-waveplate 72 on a rotation stage. The light passing through the half-waveplate 72 is then transported to the target material 74 by beam transport optics 76 and focusing assembly 78. Target material 74 is located on a positioning system. The laser systems described above may consist of any gain medium and combination of optics and thus any wavelength, as long as the pulse duration is shorter than 100 picoseconds and preferably shorter than 10 picoseconds. The polarization control consists of any combination of optics (mirrors, polarizers, waveplates, etc.) and means to translate or rotate these optics in order to produce and maintain the desired polarization. The transport/focusing optics consist of mirrors, lenses, phase plates, etc., to produce the desired spatial distribution on the material to be processed. The material to be processed may consist of metals, dielectrics, semiconductors, or any combination thereof. The material may be placed on a translation or rotation stage for motion of the material relative to the laser or alternatively the laser may be moved by the transport optics relative to the material. The processing can take place in any environment (air, vacuum, gas, liquid, solid).

The cutting process can be actively controlled if necessary to maintain the correct polarization on the part. In addition a feedback mechanism can be applied if desired in which the cutting of the material is monitored (optical imaging, plasma fluorescence/temperature, cut rate, etc.) and this information is used to control the polarization of the laser. An example of a feedback mechanism usable in the present invention is described in U.S. Pat. No. 5,720,894, which is incorporated herein by reference.

Changes and modifications in the specifically described embodiments can be carried out without departing from the scope of the invention, which is intended to be limited by the scope of the appended claims.

What is claimed is:

1. A method for improving the quality and efficiency of ultrashort-pulse laser machining, comprising:
   providing a plurality of laser pulses at a pulse repetition rate greater than 10 Hz, wherein each pulse of said plurality of laser pulses has a pulse duration of 100 ps or less and has a polarization direction defined by its electric field vector;
   directing said plurality of laser pulses onto a plurality of successive positions on a target to be machined, wherein said plurality of successive positions define a machining direction; and
   orienting said polarization direction such that said electric field vector is perpendicular to said machining direction.

2. The method of claim 1, wherein the step of orienting said polarization direction is carried out by rotating said polarization direction relative to said target.

3. The method of claim 1, wherein the step of orienting said polarization direction is carried out by rotating said target relative to said polarization direction.

4. The method of claim 1, wherein the step of orienting said polarization direction includes rotating said polarization direction in a controlled manner about an axis defined by the laser propagation direction to drill a hole.

5. The method of claim 4, wherein the step of rotating said polarization direction in a controlled manner is accomplished by producing from said plurality of pulses a circularly polarized plurality of pulses.

6. The method of claim 4, wherein the step of rotating said polarization direction in a controlled manner is accomplished by producing from said plurality of pulses an elliptically polarized plurality of pulses.

7. The method of claim 4, wherein the step of orienting said polarization direction includes producing from said plurality of pulses a linearly polarized plurality of pulses, wherein the polarization direction of said linearly polarized plurality of pulses is defined by said polarization direction, wherein the step of orienting said polarization direction further includes physically rotating said polarization direction.

8. The method of claim 7, wherein said polarization direction is physically rotated by rotating at least one optic in the path of said plurality of pulses.

9. The method of claim 8, wherein said at least one optic comprises a phase retardation plate.

10. The method of claim 7, wherein said polarization direction is physically rotated by rotating said target.

11. The method of claim 1, wherein each pulse of said plurality of laser pulses has a pulse duration in the range of from about 1 femtosecond to about 100 picoseconds.

12. The method of claim 1, wherein each pulse of said plurality of laser pulses has a wavelength in the range of from 200 to 2500 nanometers.

13. The method of claim 1, wherein each pulse of said plurality of laser pulses has a wavelength in the visible portion of the electromagnetic spectrum.

14. The method of claim 1, wherein each pulse of said plurality of laser pulses has a wavelength in the ultraviolet portion of the electromagnetic spectrum.

15. The method of claim 1, wherein each pulse of said plurality of laser pulses has a wavelength in the infrared portion of the electromagnetic spectrum.

16. The method of claim 1, wherein said plurality of laser pulses are produced by a chirped-pulse amplified solid state laser.

17. The method of claim 1, wherein each pulse of said plurality of laser pulses has an energy in the range of from about 0.01 to about 50 millijoules.

18. The method of claim 1, wherein each said laser pulse removes material from said target at a rate in the range of from about 0.01 to about 2 micrometers per pulse.

19. A method for improving the quality and efficiency of ultrashort-pulse laser machining, comprising:
   maintaining the laser polarization direction so that the electric field vector points as much as possible into the material being processed.

20. An apparatus for improving the quality and efficiency of ultrashort-pulse laser machining, comprising:
   a laser to provide an ultra-short pulse having a laser polarization direction; and means for maintaining the laser polarization direction so that the electric field vector points as much as possible into the material being processed.

* * * * *